United States Patent
Bergman et al.

(10) Patent No.: US 10,641,108 B2
(45) Date of Patent: May 5, 2020

(54) TURBINE BLADE SHROUD FOR GAS TURBINE ENGINE WITH POWER TURBINE AND METHOD OF MANUFACTURING SAME

(71) Applicant: United Technologies Corporation, Farmington, CT (US)

(72) Inventors: Russell J. Bergman, South Windsor, CT (US); Alan W. Stoner, Manchester, TN (US)

(73) Assignee: United Technologies Corporation, Farmington, CT (US)

( * ) Notice: Subject to any disclaimer, the term of this patent is extended or adjusted under 35 U.S.C. 154(b) by 118 days.

(21) Appl. No.: 15/947,254

(22) Filed: Apr. 6, 2018

(65) Prior Publication Data

US 2019/0309636 A1 Oct. 10, 2019

(51) Int. Cl.
| | | |
|---|---|---|
| *F01D 11/08* | (2006.01) | |
| *F01D 5/20* | (2006.01) | |
| *F01D 5/18* | (2006.01) | |
| *F01D 5/22* | (2006.01) | |
| *F01D 5/14* | (2006.01) | |

(52) U.S. Cl.
CPC .............. *F01D 5/20* (2013.01); *F01D 5/147* (2013.01); *F01D 5/187* (2013.01); *F01D 5/225* (2013.01); *F05D 2230/21* (2013.01); *F05D 2240/11* (2013.01); *F05D 2240/307* (2013.01); *F05D 2240/55* (2013.01); *F05D 2260/20* (2013.01); *F05D 2260/202* (2013.01)

(58) Field of Classification Search
CPC . F01D 5/187; F01D 5/20; F01D 5/225; F05D 2240/307; F05D 2240/55; F05D 2260/20; F05D 2260/202; F05D 2230/21
See application file for complete search history.

(56) References Cited

U.S. PATENT DOCUMENTS

| | | | |
|---|---|---|---|
| 3,990,308 A * | 11/1976 | McCormick | G01K 3/06 374/114 |
| 5,531,568 A * | 7/1996 | Broadhead | F01D 5/186 415/115 |
| 6,254,345 B1 * | 7/2001 | Harris | F01D 5/18 416/189 |
| 6,340,384 B1 | 1/2002 | Beeck et al. | |
| 6,491,498 B1 | 12/2002 | Seleski et al. | |
| 7,527,477 B2 | 5/2009 | Norton et al. | |

(Continued)

FOREIGN PATENT DOCUMENTS

| | | |
|---|---|---|
| GB | 2290833 A | 1/1996 |
| JP | H0828303 A | 1/1996 |

OTHER PUBLICATIONS

European Search Report for European Application No. 19167563.6 dated Aug. 13, 2019.

*Primary Examiner* — Ninh H. Nguyen
(74) *Attorney, Agent, or Firm* — Carlson, Gaskey & Olds, P.C.

(57) ABSTRACT

A blade for a gas turbine engine includes an airfoil that includes an internal passage. A shroud is arranged at an end of the airfoil and has a shroud perimeter. Axially spaced knife edges extend radially from the shroud. An area is provided between the knife edges. A pocket is recessed into the area and is circumscribed by a perimeter edge that is arranged interiorly of the shroud perimeter. An outlet fluidly connects the internal passage to the pocket.

20 Claims, 3 Drawing Sheets

(56) References Cited

U.S. PATENT DOCUMENTS

| | | | |
|---|---|---|---|
| 7,780,414 B1* | 8/2010 | Liang | B22C 9/10 |
| | | | 164/369 |
| 8,322,986 B2 | 12/2012 | DeSander et al. | |
| 9,297,267 B2* | 3/2016 | Itzel | F01D 9/041 |
| 9,464,529 B2 | 10/2016 | Zambetti et al. | |
| 2006/0280610 A1 | 12/2006 | Heyward et al. | |
| 2017/0298742 A1* | 10/2017 | Johnson | F01D 5/145 |

* cited by examiner

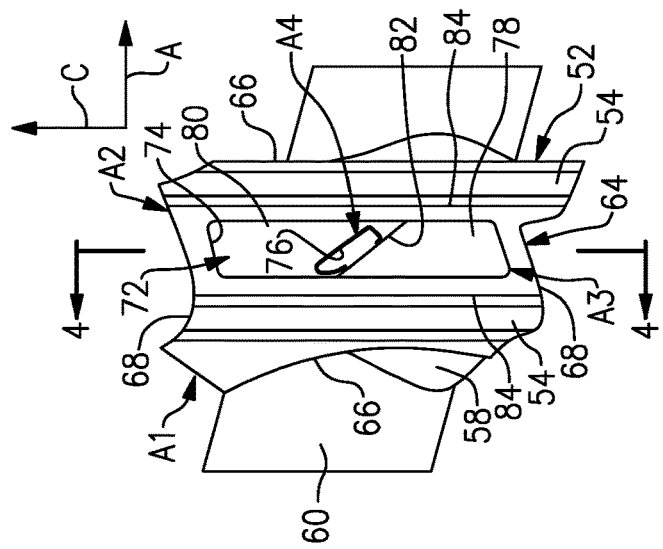
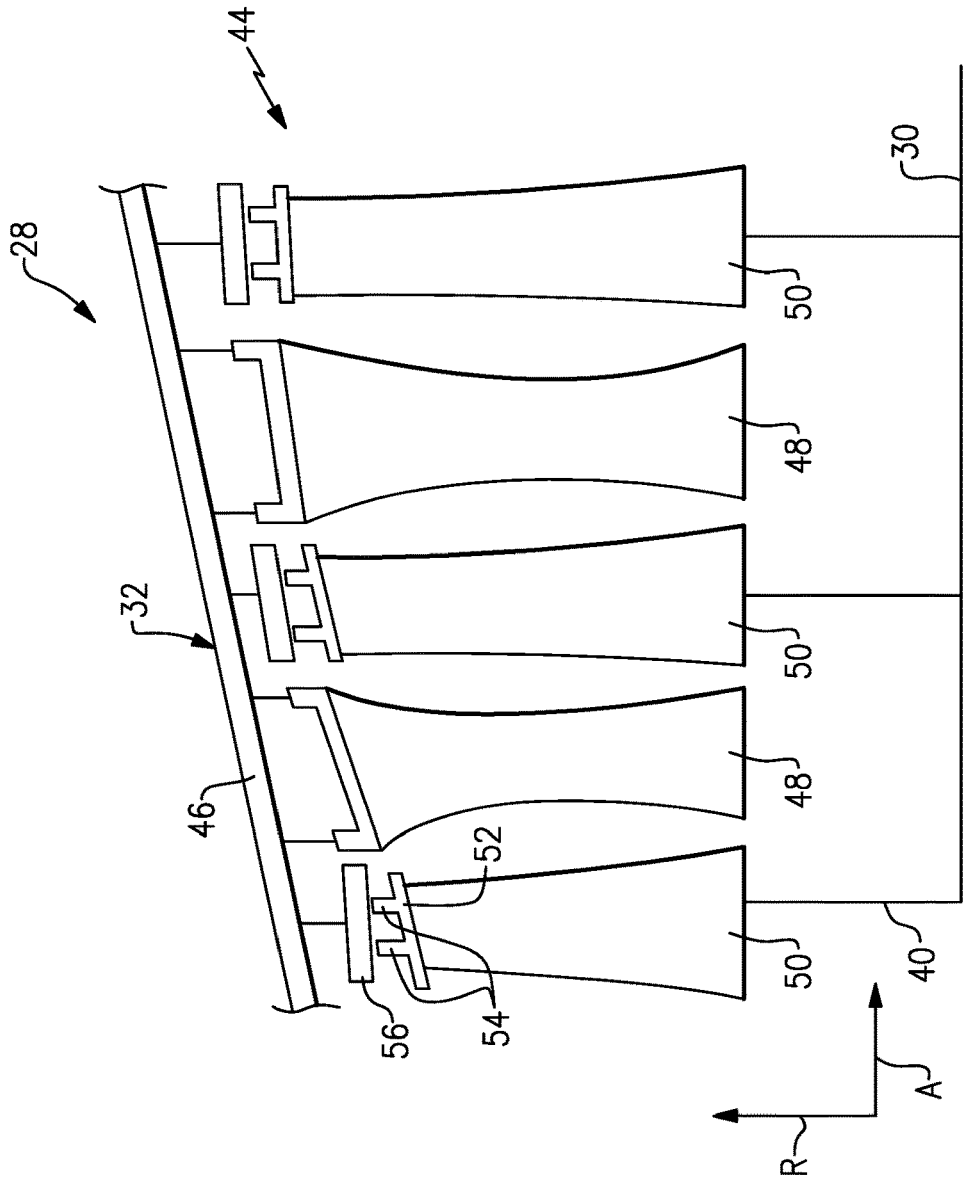
FIG.3
FIG.2

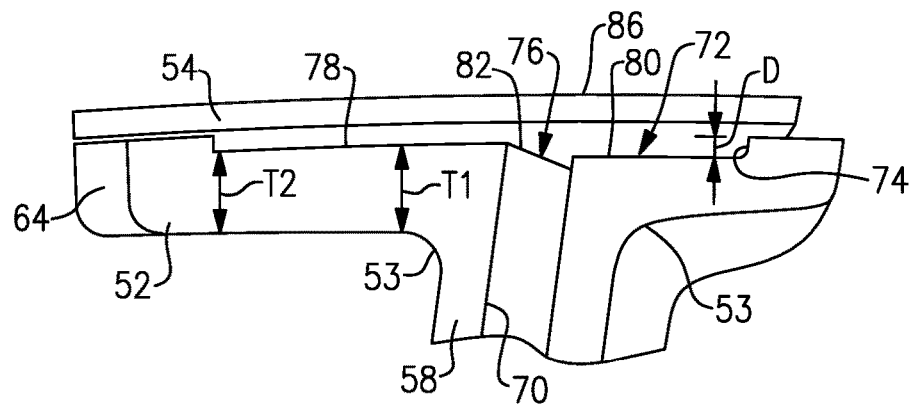
FIG.4
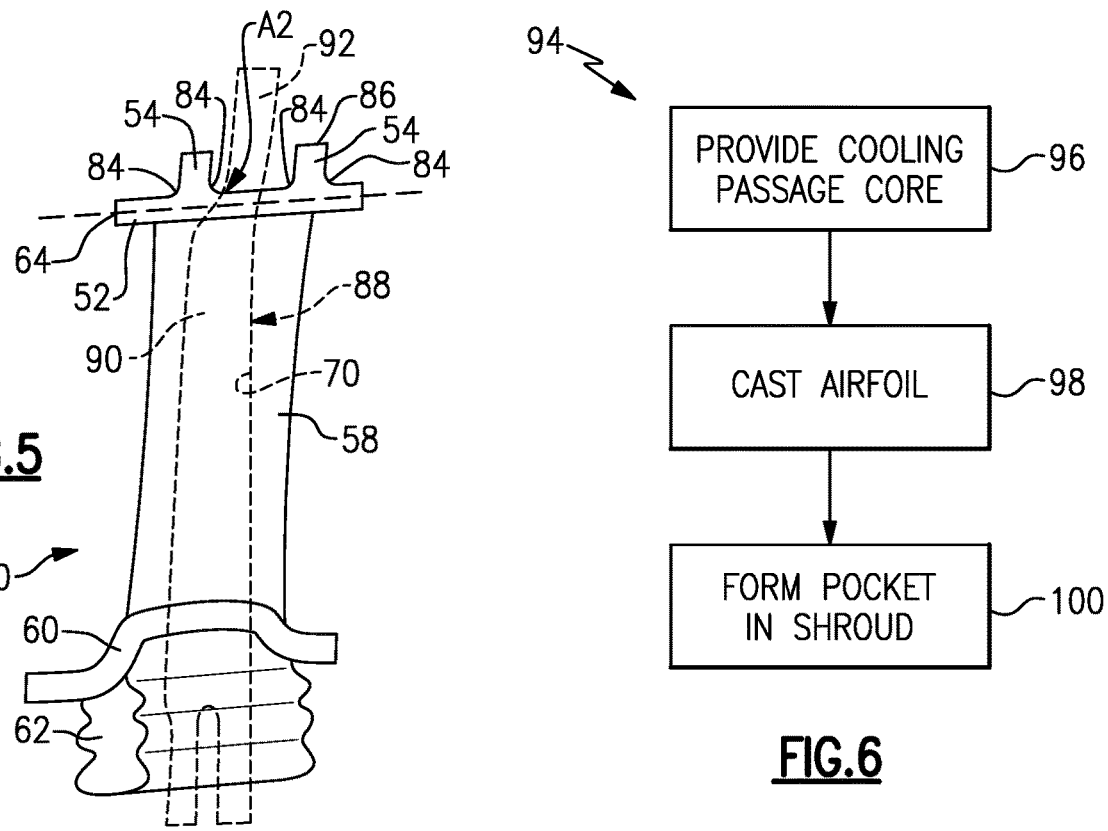
FIG.5
FIG.6

TURBINE BLADE SHROUD FOR GAS TURBINE ENGINE WITH POWER TURBINE AND METHOD OF MANUFACTURING SAME

STATEMENT REGARDING FEDERALLY SPONSORED RESEARCH OR DEVELOPMENT

This invention was made with government support under contract number W911W6-16-2-0012 and W58RGZ-16-C-0046 with the U.S. Army. The government has certain rights in the invention.

BACKGROUND

This disclosure relates to turbomachinery, and more particularly, the disclosure relates to a shrouded turbine blade and method for making the same.

Gas turbine engines include a compressor that compresses air, a combustor that ignites the compressed air and a turbine across which the compressed air is expanded. The expansion of the combustion products drives the turbine to rotate, which in turn drives rotation of the compressor.

Gas turbine engines for applications such as helicopters incorporate a power turbine (PT) that is not mechanically coupled to the compressors in the gas generator portion of the gas turbine engine. The power turbine is rotationally driven by expanding gases from the gas generator portion to transmit power to a turboshaft. The turboshaft rotationally drives the helicopter propeller, typically at a constant speed, through a gearbox.

In order to increase efficiency, a clearance between the tips of the blades in the compressor, turbine and power turbine across the outer diameter of the flowpath is kept sufficiently small. This ensures that a minimum amount of air passes between the tips and the outer diameter. Turbine blades may incorporate a shroud to provide damping. Knife edges may be provided on the shroud to seal with respect to a blade outer air seal (BOAS) to maintain tight clearances.

The shroud adds mass to the end of the blade, which increases stress. One or more pockets may be provided on the shroud to reduce weight. For small diameter blades, traditional manufacturing approaches may prevent the pocket from being formed in the shroud.

SUMMARY

In one exemplary embodiment, a blade for a gas turbine engine includes an airfoil that includes an internal passage. A shroud is arranged at an end of the airfoil and has a shroud perimeter. Axially spaced knife edges extend radially from the shroud. An area is provided between the knife edges. A pocket is recessed into the area and is circumscribed by a perimeter edge that is arranged interiorly of the shroud perimeter. An outlet fluidly connects the internal passage to the pocket.

In a further embodiment of the above, a root supports a platform. The airfoil extends radially from the platform to the shroud. The internal passage extends from the root to the shroud.

In a further embodiment of any of the above, the airfoil extends from the platform to the shroud a span. The span is less than 2.6 inches (66.0 mm).

In a further embodiment of any of the above, the shroud includes axially spaced apart axial faces and circumferentially spaced apart circumferential faces. The axial and circumferential faces define the shroud perimeter.

In a further embodiment of any of the above, the knife edges extend to the circumferential faces.

In a further embodiment of any of the above, the shroud perimeter provides a first area. The knife edges include fillets. The second area is the area between and includes the fillets facing the pocket. The second area is in a range of 40% to 60% of the first area.

In a further embodiment of any of the above, the pocket has a third area defined by the perimeter edge. The third area is in a range of 80% to 90% of the second area.

In a further embodiment of any of the above, the outlet has a fourth area. The fourth area is in a range of 5% to 25% of the third area.

In a further embodiment of any of the above, the pocket has first and second surfaces joined at a peak. The outlet is arranged on at least one side of the peak.

In a further embodiment of any of the above, the pocket has first and second surfaces joined at a peak. The shroud has first and second thicknesses spaced in a direction perpendicular to the peak on at least one of the first and second surfaces. The first and second thicknesses extend in a radial direction. The first thickness is provided at a tangent point to a fillet that joins the shroud and the airfoil. The second thickness is provided at the perimeter edge. The ratio of the first thickness to the second thickness in a range of 1.1 to 2.1.

In a further embodiment of any of the above, the depth of the pocket corresponds to the location of the second thickness at the perimeter edge that is 0.060 inch (1.52 mm) or less.

In one exemplary embodiment, a gas turbine engine includes a gas generator portion that provides an air source. A power turbine is arranged fluidly downstream from the gas generator portion. The power turbine is mechanically disconnected from the gas generator portion. The power turbine includes at least one stage of blades. Each of the blades include an airfoil that includes an internal passage. A shroud is arranged at an end of the airfoil and has a shroud perimeter. Axially spaced knife edges extend radially from the shroud. An area is provided between the knife edges. A pocket is recessed into the area and is circumscribed by a perimeter edge that is arranged interiorly of the shroud perimeter. An outlet fluidly connects the internal passage to the pocket.

In a further embodiment of the above, the shroud perimeter provides a first area. The knife edges include fillets. The second area is the area between the fillets facing the pocket. The pocket has a third area defined by the perimeter edge. The third area is in a range of 80% to 90% of the second area.

In a further embodiment of any of the above, the pocket has first and second surfaces joined at a peak. The shroud has first and second thicknesses spaced in a direction perpendicular to the peak on at least one of the first and second surfaces. The first and second thicknesses extend in a radial direction. The first thickness are provided at a tangent point to a fillet that joins the shroud and the airfoil. The second thickness is provided at the perimeter edge. The ratio of the first thickness to the second thickness is in a range of 1.1 to 2.1.

In a further embodiment of any of the above, the depth of the pocket corresponds to the location of the second thickness at the perimeter edge that is 0.060 inch (1.52 mm) or less.

In a further embodiment of any of the above, the gas turbine engine includes a root that supports a platform. The airfoil extends radially from the platform to the shroud. The internal passage extends from the root to the shroud. The airfoil extends from the platform to the shroud a span. The span is less than 2.6 inches (66.0 mm).

In a further embodiment of any of the above, the gas generator portion includes a compressor section. The power turbine is mechanically disconnected from the compressor section.

In one exemplary embodiment, a method of manufacturing a blade for a gas turbine engine provides an internal passage core and casts the airfoil to provide the blade an airfoil that includes an internal passage formed by the internal passage core. The casting step forms a shroud arranged at an end of the airfoil and forms a pocket in the shroud. The pocket is recessed into the area and is circumscribed by a perimeter edge that is arranged interiorly of the shroud perimeter. An outlet fluidly connects the internal passage to the pocket.

In a further embodiment of the above, the pocket is formed by a portion of the internal passage core.

In a further embodiment of any of the above, the pocket forming step includes electro-discharge that machines the pocket.

BRIEF DESCRIPTION OF THE DRAWINGS

The disclosure can be further understood by reference to the following detailed description when considered in connection with the accompanying drawings wherein:

FIG. 2 is a schematic view of a power turbine.

FIG. 3 is a top elevational view of a turbine blade with a tip shroud.

FIG. 4 is an enlarged cross-sectional view of the turbine blade taken along line 4-4 in FIG. 3.

FIG. 5 is a schematic view of the turbine blade with an example casting core.

FIG. 6 is a flow chart depicting an example manufacturing method for the disclosed turbine blade.

Figure 1:
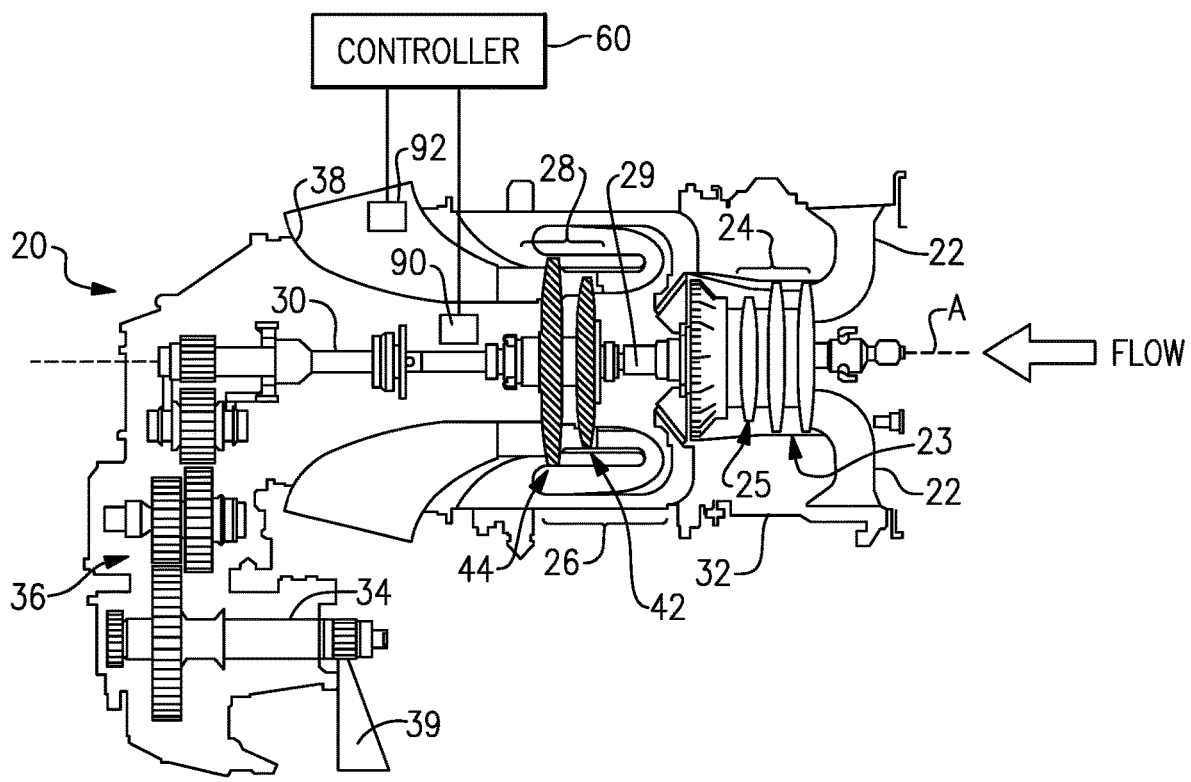
FIG. 1 is a schematic view of a gas turbine engine for use in a helicopter.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

FIG. 1 schematically illustrates a gas turbine engine 20. In this example, the engine 20 is a turboshaft engine, such as for a helicopter. The engine 20 includes an inlet duct 22, a compressor section 24, a combustor section 26, and a turbine section 28.

The compressor section 24 is an axial compressor and includes a plurality of circumferentially-spaced blades. Similarly, the turbine section 28 includes circumferentially-spaced turbine blades. The compressor section 24 and the turbine section 28 are mounted on a main shaft 29 for rotation about an engine central longitudinal axis A relative to an engine static structure 32 via several bearing systems (not shown).

During operation, the compressor section 24 draws air through the inlet duct 22. Although gas turbine engines ingest some amount of dust, such engines are typically not designed for highly dusty environments. Engines such as the engine 20 are subject to operating in highly dusty environments during takeoff and landing. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which may include first and second turbine 42, 44.

The first turbine 42 rotationally drives the compressor section 24 via a main shaft 29. Together these components provide a gas generator portion of the engine 20.

The second turbine 44, which is a power turbine in the example embodiment, rotationally drives a power shaft 30, gearbox 36, and output shaft 34. Although fluidly coupled to the gas generator portion, the power turbine 44 is mechanically disconnected from the gas generator portion. That is, the main shaft 29 and power shaft 30 are not connected to one another such that the shafts 29, 30 rotate separately and at different speeds. Moreover, there are no compressors mounted to the power shaft 30. The power turbine 44 may include a single or multiple stages of blades and vanes. The output shaft 34 rotationally drives the helicopter rotor blades 39 used to generate lift for the helicopter. The hot gas stream is expelled through an exhaust 38.

The engine 20 also includes a seal system in the turbine section 28 around the blades. Such a seal system may be referred to as a blade outer air seal (BOAS). The seal system serves to provide a minimum clearance around the tips of the blades, to limit the amount of air that escapes around the tips.

The power turbine 44 is shown in more detail in FIG. 2. The power turbine 44 includes stages of stator vanes 48 axially spaced apart from one another and supported with respect to the turbine case structure 46, which is part of the engine static structure 32. Stages of rotor blades 50 are axially interspersed between the stages of stator vanes 48.

Axially spaced apart arrays of blades 50 are supported on a rotor 40 connected to the power shaft 30. BOAS 56 are supported by the turbine case structure 46 to provide a seal with respect to an end of the blade. In the example shown, the end of the blade includes a shroud 52 supporting radially extending knife edges 54, which cooperate with the BOAS 56 to provide a seal.

Referring to FIGS. 3-5, each blade 50 includes a root 62 supporting a platform 60. An airfoil 58 extends in a radial direction R from the platform 60 to the shroud 52 a span. The span is less than 2.6 inch (66.0 mm). For blades having such a short span, it is difficult to reliable manufacture complex geometries on the surface of the blade.

A internal passage 70 (FIG. 5) extends from the root 62 to the shroud 52 in the example shown. The internal passage 70 may be supplied with cooling fluid from, for example, the compressor section 24. Alternatively, the internal passage 70 may not be supplied with any cooling fluid and may be incorporated into the blade 50 to further reduce the overall weight of the blade 50.

Referring to FIG. 3, the shroud 52 includes a shroud perimeter 64 defined by axially spaced apart faces 66 and circumferentially spaced apart faces 68, which are spaced apart from one another in a circumferential direction C. Circumferential faces of adjacent blades typically do not contact one another. The knife edges 54 extend to and connect the circumferential faces 68. The shroud perimeter 64 provides a first area A1.

The knife edges 54 include fillets 84. A second area A2 is the area between and including the fillets 84 facing a pocket 72 provided in the shroud 52 between the knife edges 54.

The second area A2 also includes the area of the pocket 72 itself. The second area A2 is in a range of 40% to 60% of the first area A1.

The pocket 72 is circumscribed by a perimeter edge 74. A perimeter edge defines a third area A3, which is in a range of 80% to 90% of the second area A2. An outlet 76 fluidly connects the internal passage 70 and the pocket 72. The outlet 76 has a fourth area A4, and the fourth area A4 is in a range of 5% to 25% of the third area A3.

The pocket 72 includes first and second surfaces 78, 80, which are generally planar, joined at a peak 82. This configuration provides tapered walls that become thinner in opposing directions and distant from peak 82. Fillets 53 join the airfoil 58 to the shroud 52. The thicker wall section near the airfoil 58 provides strength and resists bending moments, or curling stresses, under centrifugal loading. In the example, the outlet 76 is arranged on at least one side of peak 82 (although on only one side in the illustrated example). First and second surfaces 78, 80 form an angle, for example, in a range of 4° to 8°, relative to an untapered equivalent surface.

The shroud 52 has first and second thicknesses T1, T2 spaced in a direction perpendicular to peak 82 on at least one of the first and second surfaces 78, 80. The first and second thicknesses T1, T2 extend in the radial direction R. The first thickness T1 is provided at a tangent point to the fillet 53. The second thickness T2 is provided at the perimeter edge 74. The ratio of the first thickness T1 to the second thickness T2 is in a range of 1.1 to 2.1. In one example, a depth D of the pocket 72 corresponding to the location of the second thickness T2 at the perimeter edge is 0.060 inch (1.52 mm) or less.

A method of manufacturing the blade 50 is shown generally at 94 in FIG. 6. The method 94 includes providing an internal passage core 88 (FIG. 5), as indicated at block 96. The blade 50 is cast about the internal passage core 88, as indicated at block 98. The pocket 72 is formed in the shroud 52, as indicated at block 100. In one example, the pocket 72 is formed by a second portion 92 of the core 88, for example. In such an example, the core 88 includes a first core portion 90 arranged within the airfoil 58 and radially beneath the shroud 52 to form the internal passage 70. The second core portion 92 may be a unitary, continuous structure with the first core portion 90. In another example, the pocket 72 is formed by electro-discharge machining (EDM). The outlet 76 connecting the pocket 72 to the internal passage 70 may also be formed by EDM.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A blade for a gas turbine engine, comprising:
an airfoil including an internal passage;
a shroud is arranged at an end of the airfoil and has a shroud perimeter;
axially spaced knife edges extend radially from the shroud, and an area is provided between the knife edges;
wherein a pocket is recessed into the area and is circumscribed by a perimeter edge that is arranged interiorly of the shroud perimeter, and an outlet fluidly connects the internal passage to the pocket; and
wherein the shroud perimeter provides a first area, the knife edges include fillets, and a second area is the area between and including the fillets facing the pocket, the second area is in a range of 40% to 60% of the first area, the pocket has a third area defined by the perimeter edge, the third area is in a range of 80% to 90% of the second area.

2. The blade of claim 1, comprising a root supporting a platform, and the airfoil extends radially from the platform to the shroud, and the internal passage extends from the root to the shroud.

3. The blade of claim 2, wherein the airfoil extends from the platform to the shroud a span, the span is less than 2.6 inches (66.0 mm).

4. The blade of claim 1, wherein the shroud includes axially spaced apart axial faces and circumferentially spaced apart circumferential faces, the axial and circumferential faces define the shroud perimeter.

5. The blade of claim 4, wherein the knife edges extend to the circumferential faces.

6. The blade of claim 1, wherein the outlet has a fourth area, and the fourth area is in a range of 5% to 25% of the third area.

7. A blade for a gas turbine engine, comprising:
an airfoil including an internal passage;
a shroud is arranged at an end of the airfoil and has a shroud perimeter;
axially spaced knife edges extend radially from the shroud, and an area is provided between the knife edges; and
wherein a pocket is recessed into the area and is circumscribed by a perimeter edge that is arranged interiorly of the shroud perimeter, and an outlet fluidly connects the internal passage to the pocket, wherein the pocket has first and second surfaces joined at a peak, the outlet arranged on at least one side of the peak.

8. The blade of claim 7, wherein the shroud includes axially spaced apart axial faces and circumferentially spaced apart circumferential faces, the axial and circumferential faces define the shroud perimeter, the shroud perimeter provides a first area, the knife edges include fillets, and a second area is the area between and including the fillets facing the pocket, the second area is in a range of 40% to 60% of the first area.

9. The blade of claim 8, wherein the pocket has a third area defined by the perimeter edge, the third area is in a range of 80% to 90% of the second area.

10. The blade of claim 9, wherein the outlet has a fourth area, and the fourth area is in a range of 5% to 25% of the third area.

11. A blade for a gas turbine engine, comprising:
an airfoil including an internal passage;
a shroud is arranged at an end of the airfoil and has a shroud perimeter;
axially spaced knife edges extend radially from the shroud, and an area is provided between the knife edges; and
wherein a pocket is recessed into the area and is circumscribed by a perimeter edge that is arranged interiorly of the shroud perimeter, and an outlet fluidly connects the internal passage to the pocket, wherein the pocket has first and second surfaces joined at a peak, the shroud has first and second thicknesses spaced in a direction perpendicular to the peak on at least one of the first and second surfaces, the first and second thicknesses extending in a radial direction, the first thickness provided at a tangent point to a fillet joining the shroud and the airfoil, and the second thickness provided at the perimeter edge, the ratio of the first thickness to the second thickness in a range of 1.1 to 2.1.

12. The blade of claim 11, wherein a depth of the pocket corresponds to the location of the second thickness at the perimeter edge is 0.060 inch (1.52 mm) or less.

13. The blade of claim 11, wherein the shroud includes axially spaced apart axial faces and circumferentially spaced apart circumferential faces, the axial and circumferential faces define the shroud perimeter, the shroud perimeter provides a first area, the knife edges include fillets, and the second area is the area between and including the fillets facing the pocket, the second area is in a range of 40% to 60% of the first area.

14. The blade of claim 13, wherein the pocket has a third area defined by the perimeter edge, the third area is in a range of 80% to 90% of the second area.

15. The blade of claim 14, wherein the outlet has a fourth area, and the fourth area is in a range of 5% to 25% of the third area.

16. A gas turbine engine comprising:
a gas generator portion providing an air source;
a power turbine arranged fluidly downstream from the gas generator portion, the power turbine mechanically disconnected from the gas generator portion, the power turbine including at least one stage of blades, each of the blades including:
an airfoil including an internal passage;
a shroud is arranged at an end of the airfoil and has a shroud perimeter;
axially spaced knife edges extend radially from the shroud, and an area is provided between the knife edges; and
wherein a pocket is recessed into the area and is circumscribed by a perimeter edge that is arranged interiorly of the shroud perimeter, and an outlet fluidly connects the internal passage to the pocket, wherein the pocket has first and second surfaces joined at a peak, the shroud has first and second thicknesses spaced in a direction perpendicular to the peak on at least one of the first and second surfaces, the first and second thicknesses extending in a radial direction, the first thickness provided at a tangent point to a fillet joining the shroud and the airfoil, and the second thickness provided at the perimeter edge, the ratio of the first thickness to the second thickness in a range of 1.1 to 2.1.

17. The gas turbine engine of claim 16, wherein the shroud perimeter provides a first area, the knife edges include fillets, and a second area is the area between the fillets facing the pocket, the pocket has a third area defined by the perimeter edge, the third area is in a range of 80% to 90% of the second area.

18. The gas turbine engine of claim 16, wherein a depth of the pocket corresponds to the location of the second thickness at the perimeter edge is 0.060 inch (1.52 mm) or less.

19. The gas turbine engine of claim 16, comprising a root supporting a platform, and the airfoil extends radially from the platform to the shroud, and the internal passage extends from the root to the shroud, wherein the airfoil extends from the platform to the shroud a span, the span is less than 2.6 inches (66.0 mm).

20. The gas turbine engine of claim 16, wherein the gas generator portion includes a compressor section, the power turbine is mechanically disconnected from the compressor section.

* * * * *